US008594295B2

(12) United States Patent
Chan et al.

(10) Patent No.: US 8,594,295 B2
(45) Date of Patent: Nov. 26, 2013

(54) METHOD AND APPARATUS FOR ONE NUMBER MAPPING DIRECTORY PRESENCE SERVICE

(75) Inventors: Victor Chan, Saratoga, CA (US); William J. Beyda, Cupertino, CA (US)

(73) Assignee: Siemens Enterprise Communications, Inc., Boca Raton, FL (US)

( * ) Notice: Subject to any disclaimer, the term of this patent is extended or adjusted under 35 U.S.C. 154(b) by 829 days.

(21) Appl. No.: 12/446,038

(22) PCT Filed: Oct. 17, 2007

(86) PCT No.: PCT/US2007/022166
§ 371 (c)(1),
(2), (4) Date: May 28, 2010

(87) PCT Pub. No.: WO2008/051419
PCT Pub. Date: May 2, 2008

(65) Prior Publication Data
US 2010/0232418 A1     Sep. 16, 2010

Related U.S. Application Data

(60) Provisional application No. 60/853,126, filed on Oct. 20, 2006.

(51) Int. Cl.
*H04M 3/42* (2006.01)

(52) U.S. Cl.
USPC ............. 379/210.01; 379/93.24; 379/900; 455/414.4; 715/752

(58) Field of Classification Search
USPC ......... 379/88.13, 93.24, 900, 100.08, 100.13, 379/142.14, 210.02; 455/459, 461, 414.4, 455/432.2; 709/203; 715/752
See application file for complete search history.

(56) References Cited

U.S. PATENT DOCUMENTS

| 6,754,317 B1 | 6/2004 | Berthoud et al. |
| 6,883,015 B1 * | 4/2005 | Geen et al. ................... 709/203 |
| 2005/0259658 A1 | 11/2005 | Logan et al. |

FOREIGN PATENT DOCUMENTS

| EP | 1221803 A1 | 7/2002 |
| WO | 9738538 A1 | 10/1997 |

OTHER PUBLICATIONS

International Search Report for PCT/US2007/022166 dated Apr. 23, 2008 (Form PCT/ISA/210).
Written Opinion of The International Searching Authority dated Apr. 23, 2008 (Form PCT/ISA/237).
International Preliminary Report on Patentability for PCT/US2007/022166 dated Apr. 22, 2009 (Form PCT/IB/373).

* cited by examiner

*Primary Examiner* — Md S Elahee
(74) *Attorney, Agent, or Firm* — Buchanan Ingersoll & Rooney PC

(57) ABSTRACT

A method includes associating an e-mail address with a plurality of telephone numbers; associating one of the telephone numbers with a one number service (108); allowing telephone calls to the one of the telephone numbers by selecting the e-mail address. In some embodiments, the allowing telephone calls comprises calling a programmed caller number and calling to a called party number associated with the e-mail address. In some embodiments, a called party and a calling party are subscribers to a one-number service (108).

16 Claims, 13 Drawing Sheets

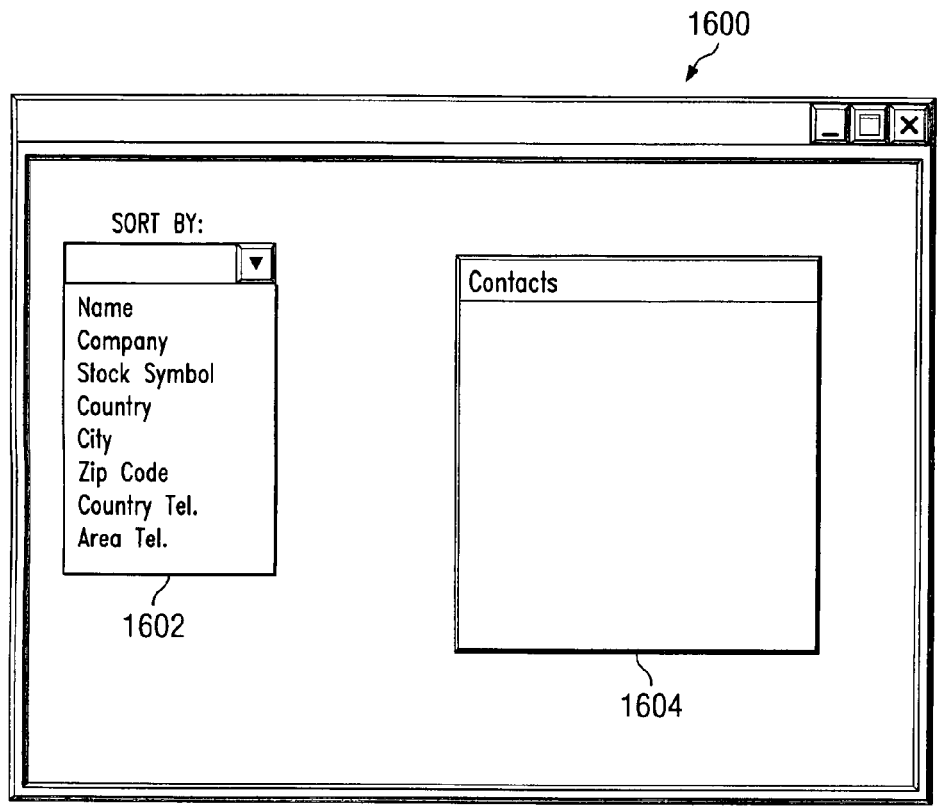
FIG. 15
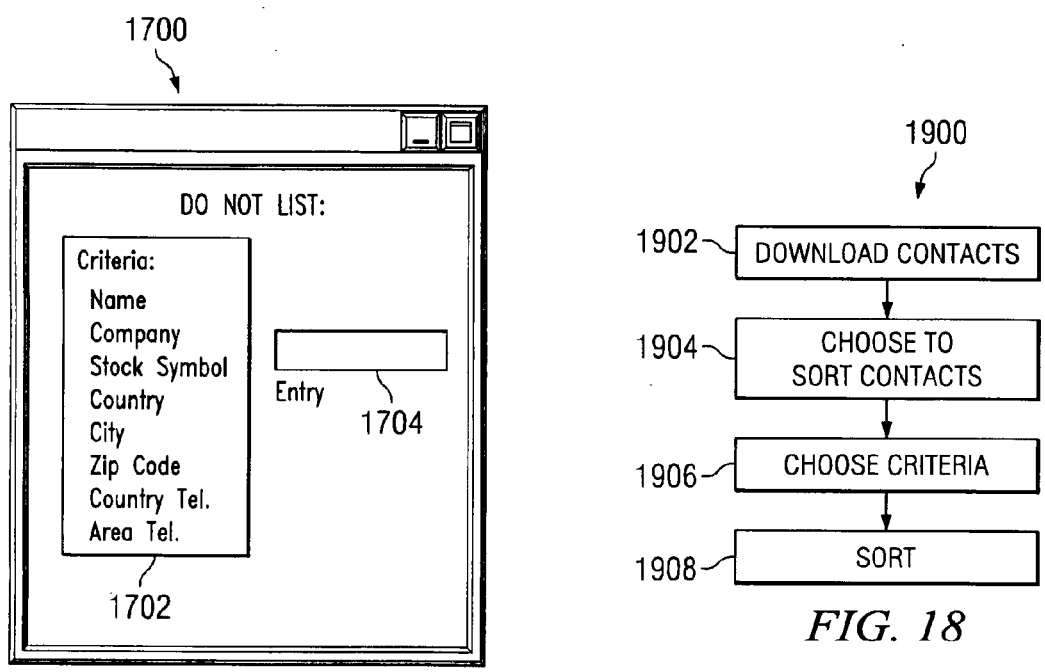
FIG. 16
FIG. 18

METHOD AND APPARATUS FOR ONE NUMBER MAPPING DIRECTORY PRESENCE SERVICE

CROSS-REFERENCE TO RELATED APPLICATIONS

This application is the US National Stage of International Application No. PCT/US2007/022166, filed on Oct. 17, 2007, and claims the benefit thereof, and international Application No. PCT/US2007/022166 claims priority from U.S. Provisional Patent Application Ser. No. 60/853,126, filed Oct. 20, 2006, titled "ReachMe Service," which is hereby incorporated by reference in its entirety as if fully set forth herein.

BACKGROUND OF THE INVENTION

1. Field of the Invention

This invention relates to telecommunications systems. More particularly, the invention relates to an improved one number service.

2. Description of the Related Art

Users of telecommunications services increasingly desire to be reachable at all times. To this end, users often have a plurality of telecommunications devices and hence telephone numbers. For example, a user can have one or more business, home, and cellular telephones and corresponding telephone numbers. Paradoxically, this proliferation of devices can inhibit communication, as a caller does not necessarily know at which device the user is available. Thus, actually completing a call to the user can require the dialing of a plurality of telephone numbers, which can be relatively time-consuming and frustrating for the caller.

One Number Service (ONS) is a service which allows a user to have one telephone number for multiple telephones. The user can specify an ONS telephone number and/or a personal identification number (PIN) where the call can be received at a given time. For example, the user can have a call to the given number forwarded to his cell phone, his business phone, or his home phone.

Telephonic communication is frequently triggered by reception of an e-mail. However, if the e-mail itself does not contain the sender's ONS identification, the user must manually look up the ONS number or PIN. Further, if a caller has multiple entries in his address book for the user, he does not necessarily know which of the numbers is the ONS "one number," which can obviate any advantage in having the One Number Service.

In addition, traditional One Number Services are essentially local to a given premises or company. While network federation implementations could allow for One Number Service across companies, they are relatively complex and expensive processes, particularly when only a small number of employees from each of the interworking companies need to interact. In such cases, the usual option is to completely forego a One Number Service. Thus, users generally cannot readily leverage or make use of ONS tools to reach or collaborate with someone across premises or companies. Again, this limits the advantages of having the One Number Service.

Finally, existing One Number Services are associated with individual users rather than a particular enterprise or business entity. Thus, if the user leaves the enterprise, he takes his One Number Service and hence his contacts with him. Thus, existing One Number Services are not necessarily retained by the enterprise.

As such, there is a need for an improved One Number Service.

SUMMARY OF THE INVENTION

These and other drawbacks in the prior art are overcome in large part by a system and method according to embodiments of the present invention.

Embodiments of the present invention provide an improved one number service. A telecommunications service according to embodiments of the present invention includes a one number service configured to allow subscribers to associate a plurality of telephone numbers with one of multiple numbers; a registry service configured to allow subscribers to associate the number with an e-mail address; and a dialing service configured to call the number responsive to receiving as an input the e-mail address. According to some embodiments, a telecommunications service further includes an e-mail generator configured to send an invitation to subscribe to the e-mail registry and one number services if a sender of e-mail is not a subscriber. Other embodiments include a packet telephone interface for making a telephone call to the dialed number over a packet network.

A method according to embodiments of the present invention includes associating an e-mail address with a plurality of telephone numbers; associating one of the telephone numbers with a one number service; allowing telephone calls to the one of the telephone numbers by selecting the e-mail address. In some embodiments, the allowing telephone calls comprises calling a programmed caller number and calling to a called party number associated with the e-mail address. In some embodiments, a called party and a calling party are subscribers to a one-number service.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

FIG. 15 is a diagram illustrating an exemplary user interface of embodiments of the present invention.

FIG. 16 is a diagram illustrating an exemplary user interface of embodiments of the present invention.

FIG. 18 is a flowchart illustrating operation of an embodiment of the present invention.

DETAILED DESCRIPTION OF EMBODIMENTS OF THE INVENTION

Figure 1:
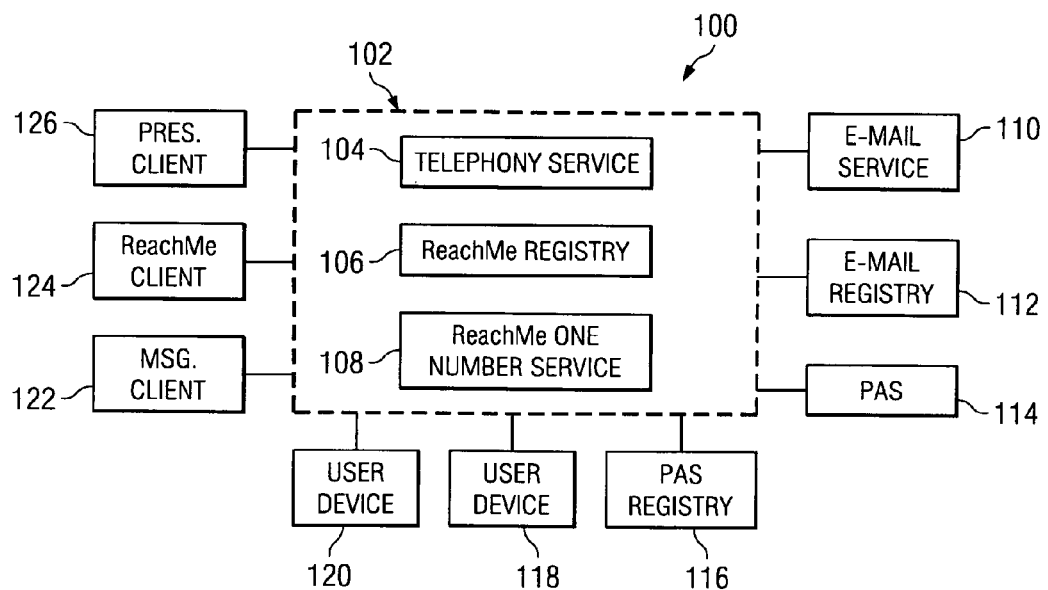
FIG. 1 illustrates an exemplary system according to embodiments of the present invention.

Turning now to the drawings and, with particular attention to FIG. 1, a diagram of a telecommunications system 100 according to an embodiment of the present invention is shown. The telecommunications system 100 may include a processing system 102, which may include or be in communication with a telephony service 104 and a one number service 108. In addition, the processing system may include or implement a ReachMe registry service 106 in accordance with embodiments of the present invention, as will be explained in greater detail below.

The processing system 102 may include or be in communication with an e-mail service 110, an e-mail registry 112, a presence and availability service 114, and a presence and availability registry 116. As will be explained in greater detail below, the e-mail service 110 may implement an e-mail server for forwarding e-mails to and from one or more users. The e-mail registry 112 may identify users and e-mail addresses. The e-mail registry 112 thus may include user lists such as address books or contact lists for individual users.

The presence and availability service 114 monitors the presence status or context of one or more users or devices. The presence and availability service 114 may be or include an application that monitors the presence and availability of devices or identities. That is, the presence and availability service 114 monitors the presence state or device context of one or more devices. The presence and availability service 114 may further determine a user presence status or identity context from the device information. The presence and availability registry 116 maintains one or more lists of parties to be monitored for particular users and may further define availability rules for those users. These lists may include, for example, user lists such as a user's buddy or presence contact lists, and users' "allowed-to-call-me" lists.

The processing system 102 may further be in communication with one or more messaging clients 122, presence clients 126, and ReachMe clients 124, in accordance with embodiments of the present invention. As will be explained in greater detail below, the clients permit communication with and control of the respective services and may allow maintenance of contact or user lists for each of the clients, which may be communicated to the respective services and/or registries.

User devices, such as user devices 118, 120 may be connected to or in communication with the processing system 102. In certain embodiments, the user devices may be implemented as telephones, cellular telephones, PDAs, computers, hard or soft clients, etc. For example, user devices 118, 120 may be embodied as personal computers implementing the Windows XP operating system and the Explorer web browser. In addition, the user devices 118, 120 may include telephony and other multimedia messaging capability using, for example, peripheral cameras, Webcams, microphones, and speakers (not shown) or peripheral telephony handsets, such as the optPoint handset available from Siemens Communication, Inc. The user devices 118, 120 may communicate with or control the messaging client 122, the ReachMe client 124 and the presence client 126, as well as the e-mail and PAS registries 112, 114. In some embodiments, the various registries are provided at network servers remote from the client devices 118, 120. In other embodiments, the registries are local to each client device.

In certain embodiments, the system 100 may also include other hardware and/or software components (e.g., gateways, proxy servers, registration server, presence servers, redirect servers, databases, applications, etc.) such as, for example, hardware and software used to support a SIP (Session Initiation Protocol) or other protocol based infrastructure for the system 100 and allow the registration of SIP devices in the system 100.

The processing system 102 may be implemented in hardware and/or software operating on one or more servers, computer systems, host or mainframe computers, workstations, etc. In some embodiments, the processing system 102 may be operating on some or all of the same devices as other components in the system 100.

As will be explained in greater detail below, in some embodiments of the present invention, an improved One Number service is provided. The ReachMe service 106 receives a party's e-mail address as an input and accesses a corresponding One Number telephone number. The One Number service 108 then causes the telephony service 104 to call out to the calling party (at a predetermined number) and to the called party at the appropriate number.

In addition, certain embodiments of the present invention provide for a "viral" presence adoption. In particular, the ReachMe service 106 allows for users to import entries from an e-mail registry 112 into the PAS registry 116. That is, users can batch import address book contacts from, for example, an Outlook address book, into the user's presence contact and watch lists. That is, the entries in a user's address book are used to pre-populate the user's "buddy" or contact list and "allowed-to-call-me" list. If a party who is on the user's "allowed-to-call me" list is not a subscriber to the presence/ReachMe service, he may become one. In such cases, his user lists, such as his buddy list or "allowed-to-call-me" list will be pre-populated with the user's name and those of other subscribers who have the new party on their "allowed-to-call-me" and/or other user lists. Because the resulting presence contact/buddy list(s) may be unmanageably large, embodiments of the present invention allow for convenient organizing of the lists, as will be explained in greater detail below.

The presence and availability service 114 may be implemented in software operating on one or more servers, computer systems, host or mainframe computers, workstations, etc. In some embodiments the presence and availability service 114 may be operating on some or all of the same device(s) as other components in the system 100.

In some embodiments, the presence and availability service 114 may be or include an application that communicates with or is connected to one or more registered devices (e.g., devices 118, 120), that allows devices to register with the system 100 or helps facilitate their registration, etc. For example, in a SIP environment, the devices 118, 120 may be registered with the system 100 and may show up or be described in registration databases as being assigned to particular identities.

A presence and availability service that may be suitably adapted for use in conjunction with the present invention is the OpenScape system, available from Siemens Comm., Inc.

The telephony service 104 may be implemented as a conventional telephone service or may be implemented as a Voice over IP telephony system, such as those implementing the Session Initiation Protocol (SIP). The telephony service 104 may include one or more dialers or dialing services for dialing out to and connecting various of the user devices in telephony communication. The telephony service 104 may be implemented in hardware and/or software operating on one or more servers, computer systems, host or mainframe computers, workstations, etc. In some embodiments the telephony service 104 may be operating on some or all of the same device(s) as other components in the system 100.

The One Number service 108 may be a service that allows users to set a number as a one number, calling of which "follows" the user to predetermined telephones and/or telephone numbers. The One Number service 108 may be implemented in hardware and/or software operating on one or more servers, computer systems, host or mainframe computers, workstations, etc. In some embodiments the One Number service 108 may be operating on some or all of the same device(s) as other components in the system 100.

The ReachMe registry service 106 allows users to register an e-mail address and associate it with, or map it to, a telephone number. The e-mail address thus functions as a global identifier. Receiving the e-mail address input causes the ReachMe service 106 to access the number and, in conjunction with the One Number service 108, to call out to the corresponding party. In addition, the ReachMe registry service 106 allows users to import entries from their e-mail address books to their presence contact and other lists and to organize them efficiently. The ReachMe registry service 106 can also pre-populate a new subscriber's presence contract and other lists with the names of existing subscribers who have the new subscriber on their user lists, such as thier "allowed-to-call-me" lists.

The ReachMe registry service 106 may be implemented in hardware and/or software operating on one or more servers, computer systems, host or mainframe computers, workstations, etc. In some embodiments the ReachMe registry service 106 may be operating on some or all of the same device(s) as other components in the system 100.

Figure 2:
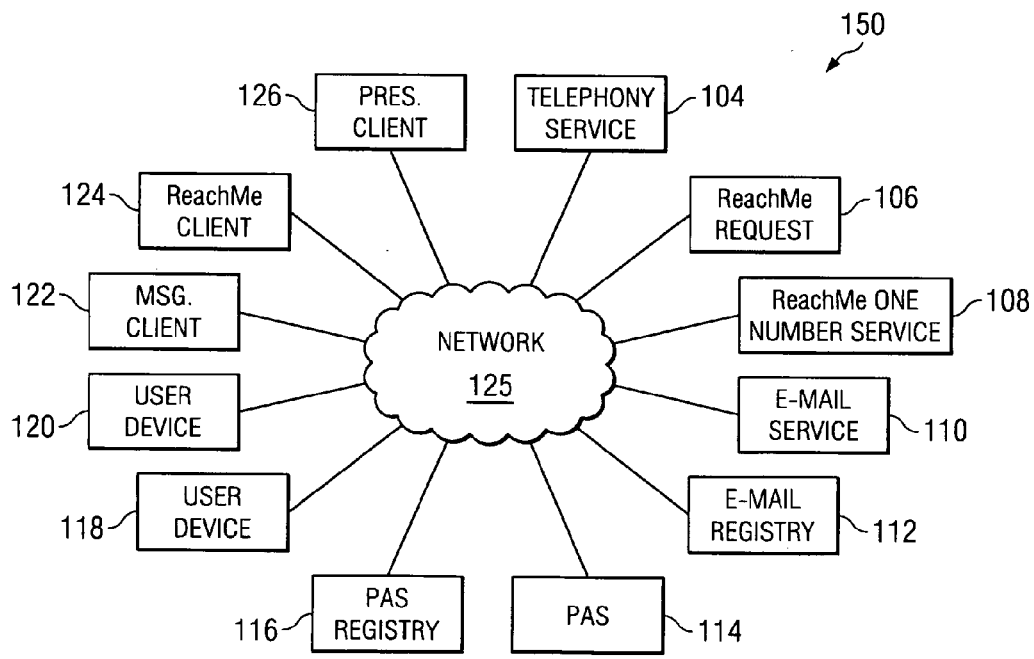
FIG. 2 illustrates an exemplary system according to embodiments of the present invention.

In certain embodiments of the present invention, one or more of the components of the system 100 may be connected to or in communication with each other via a communication network. For example, turning now to FIG. 2, a system 150 including the components of the system 100 is illustrated, wherein some or all of the components are in communication via a network 125. The network 125 may be or include the Internet, World Wide Web, a local area network, or some other public or private computer, cable, telephone, client/server, peer-to-peer, or communication network or intranet. In some embodiments, the communication network can also include other public and/or private wide area networks, local area networks, wireless networks, data communications networks, or connections, intranets, routers, satellite links, microwave links, cellular or telephone networks, radio links, fiber optic transmission lines, ISDN lines, T1 lines, DSL connections, the public switched telephone network (PSTN), etc. Moreover, as used herein, communications include those enabled by wired or wireless technology. In some embodiments, some or all of the network 125 may be implemented using a TCP/IP network and may implement voice or multimedia over IP using, for example, the Session Initiation Protocol (SIP).

In addition, as will be explained in greater detail below, in certain embodiments, the ReachMe registry service 106 allows a service provider to connect users on different on-premise and hosted systems and allows service providers to facilitate adoption and efficient communication.

Figure 3A:
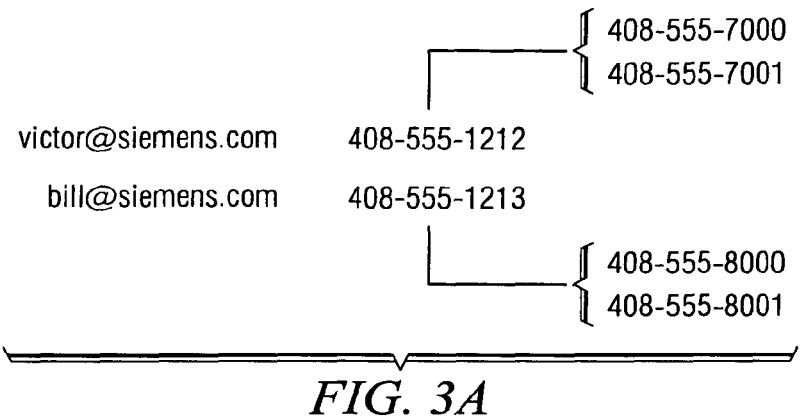
FIG. 3A and FIG. 3B schematically illustrate e-mail to one number mapping and interface in accordance with embodiments of the present invention.

As discussed above, one aspect of the present invention relates to providing an improved One Number service. Operation of such a service is illustrated by way of example in FIG. 3A. Shown in FIG. 3A are exemplary e-mail addresses victor@siemens.com and bill@siemens.com. Victor is associated with phone numbers 408-492-555-1212, 408-555-7000, and 408-555-7001. Bill is associated with telephone numbers 408-555-1213, 408-555-8000 and 408-555-8001. The numbers 408-555-1212 and 408-555-1213 are associated with a One Number service. Dialing the One Number associated numbers allows a call to be received at the subsidiary numbers, e.g., 408-555-7000, 408-555-7001, or 408-555-8000, 408-555-8001, respectively. According to embodiments of the present invention, a user can select or enter the e-mail address. The e-mail address is associated with the corresponding one number such that a call can be made to the one number responsive to clicking, selecting, or entering the e-mail address. It is noted that, while FIG. 3A illustrates dedicated "pilot" one numbers (408-555-1212 and 408-555-1213) in association with a one number service, in other embodiments, the e-mail address can simply be associated with any of the user's numbers. Thus, in some embodiments, no such "pilot" number is required.

Figure 3B:
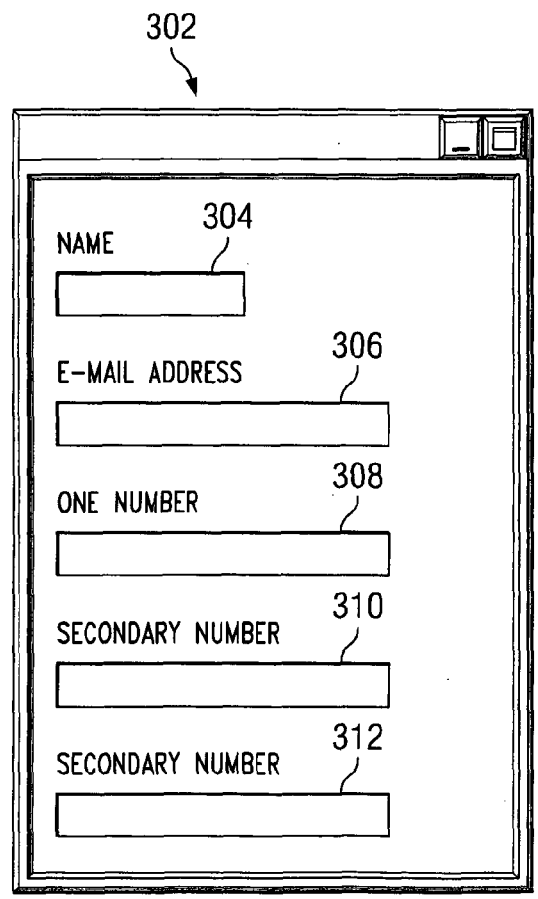

FIG. 3B illustrates an exemplary user interface that may be provided with a ReachMe client 124 for setting the e-mail address/One Number association. Window 302 includes name field 304, e-mail field 306, one number field 308, and secondary number fields 310, 312. In operation, the user can enter the e-mail address and One/called number fields and automatically associate them with each other and the secondary numbers for making One Number calls.

Figure 4:
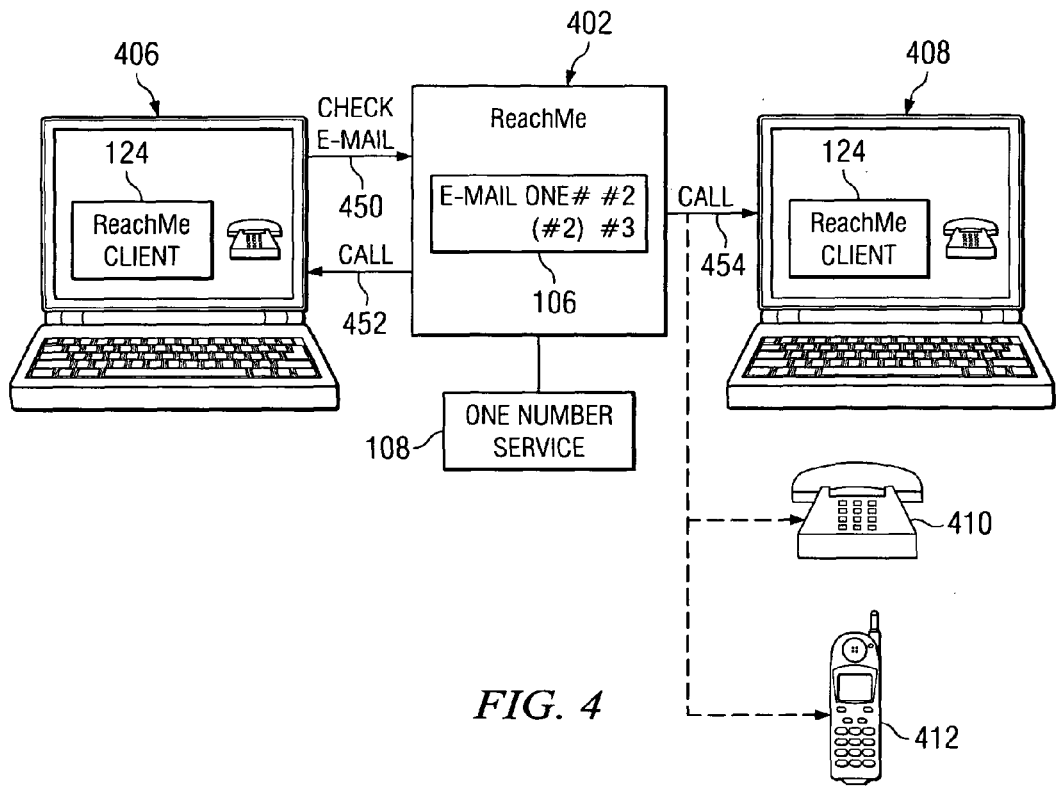
FIG. 4 is a diagram schematically illustrating operation of embodiments of the present invention.

This is illustrated more particularly with respect to FIG. 4. Shown in FIG. 4 is a ReachMe subscription service 402 including a ReachMe registry service 106 and coupled to or in communication with a One Number Service 108. The ReachMe service 106 stores lists of subscribers including e-mail addresses and associated telephone numbers and, in particular, One Numbers. Also shown are user devices 406 and 408. The user devices 406, 408 may implement ReachMe clients 124 in accordance with embodiments of the present invention. As shown, the user associated with device 408 is a subscriber to the One Number service 108 and thus has a plurality of telephone devices, such as 410, 412. A user of device 406 also may be a subscriber and may have an associated telephone or computer-telephony client, as well as others (not shown).

In operation, user of device 406 may select or enter an e-mail address using, for example, the ReachMe client 124. The ReachMe client 124 may be implemented as a standalone client or a plug in or web browser type client that can communicate with the ReachMe service 106 over the Internet. The ReachMe client 124 thus will send a signal or instruction to the ReachMe service 106 indicative of the selected e-mail address. In response, the ReachMe service 106 accesses its database(s) (not shown) for subscribers associated with the e-mail address and finds a corresponding telephone number, such as a number associated with a One Number Service. The One Number Service 106 then calls out, or causes a telephony service to call out, to a predetermined number associated with the calling party user 406, at 452. The One Number Service 106 further calls out or causes a telephony service to call out to the party associated with the e-mail address, at 454. Since the number may be associated with a plurality of numbers, the call may actually be received at any of devices 408, 410, 412.

Figure 5:
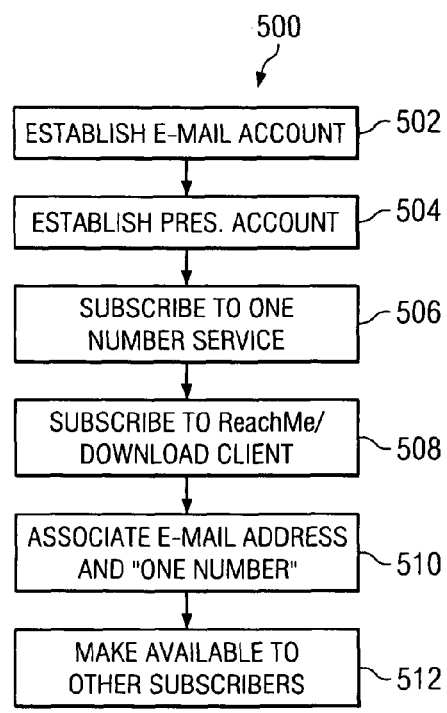
FIG. 5 is a flowchart illustrating operation of an embodiment of the present invention.

Turning now to FIG. 5, a flowchart 500 illustrating operation of embodiment of the present invention is shown. The particular arrangement of elements in the flowchart 500 is not meant to imply a fixed order to the elements; embodiments can be practiced in any order that is practicable.

Initially, in a step 502, a user can establish an e-mail account. In a process step 504, the user can subscribe to a presence account. In a process step 506, the user can subscribe to a One Number service. In a process step 508, a user can subscribe to a ReachMe service 106 and download the ReachMe client 124. In a process step 510, the user can associate the e-mail address with the One Number Service using the ReachMe client 124 and, for example, an interface such as shown in FIG. 3B. This can include, for example, telephone numbers associated with the e-mail address for receiving calls as well as a calling party telephone number for making calls. Finally, in a process step 512, the information can be made available to other subscribers, for example, by being uploaded by the ReachMe registry 106 into one or more databases (not shown).

Figure 6:
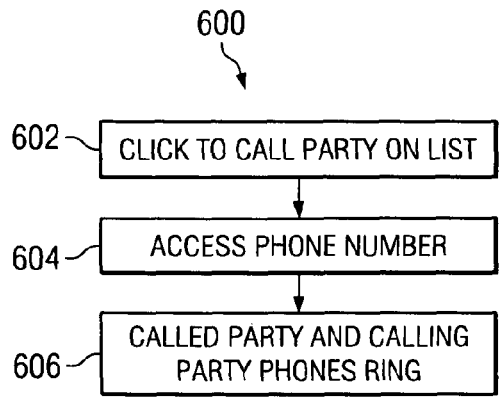
FIG. 6 is a flowchart illustrating operation of an embodiment of the present invention.

Turning now to FIG. 6, a flowchart 600 illustrating operation of embodiment of the present invention is shown. The particular arrangement of elements in the flowchart 600 is not meant to imply a fixed order to the elements; embodiments can be practiced in any order that is practicable.

In a process step 602, a user can open his ReachMe client 124 to access a list of names and e-mail addresses and click on or otherwise enter an e-mail address he wishes to call. In a process step 604, the ReachMe service 106 reads the e-mail address and accesses the appropriate telephone number. In a step 606, the ReachMe service 106 causes the One Number Service 108 to call out the appropriate calling party number and called party number.

Figure 7:
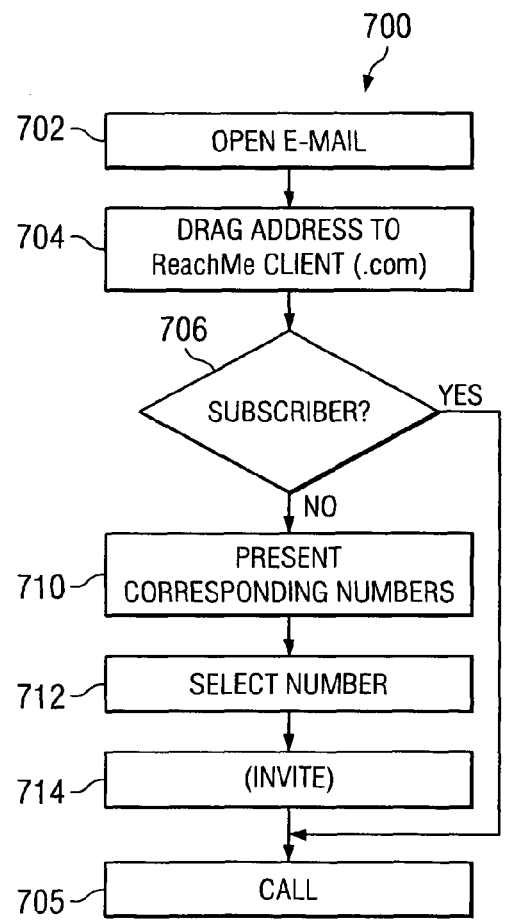
FIG. 7 is a flowchart illustrating operation of an embodiment of the present invention.

Turning now to FIG. 7, a flowchart 700 illustrating operation of embodiment of the present invention is shown. The particular arrangement of elements in the flowchart 700 is not meant to imply a fixed order to the elements; embodiments can be practiced in any order that is practicable.

In a process step 702, a user can open an e-mail using, for example, his e-mail client 122. In a process step 704, a user can use a cursor pointing device to drag the e-mail address to the ReachMe client 124 or icon in a graphical user interface (not shown). In a step 706, the ReachMe client 124 can check if the e-mail address is associated with a subscriber. If it is, then in a step 705, the ReachMe client 124 can cause the One Number service 108 to call, in a manner similar to that discussed above. Otherwise, in a process step 710, the ReachMe client 124 will cause the messaging client 122 to display the corresponding address book entry. In a process step 712, the corresponding number may be selected. In a process step 714, the user can generate an invitation e-mail to the party, for example, through communication with the e-mail service 110 (FIG. 1). The invitation indicates to the contacted party that someone is trying to reach him through the ReachMe One Number service and that he can provide better accessibility by signing up for it. In some embodiments, the e-mail may further include, for example, one or more hyperlinks to a web page or site for subscribing to the service. Finally, the number can be called, in a process step 705.

Figure 8:
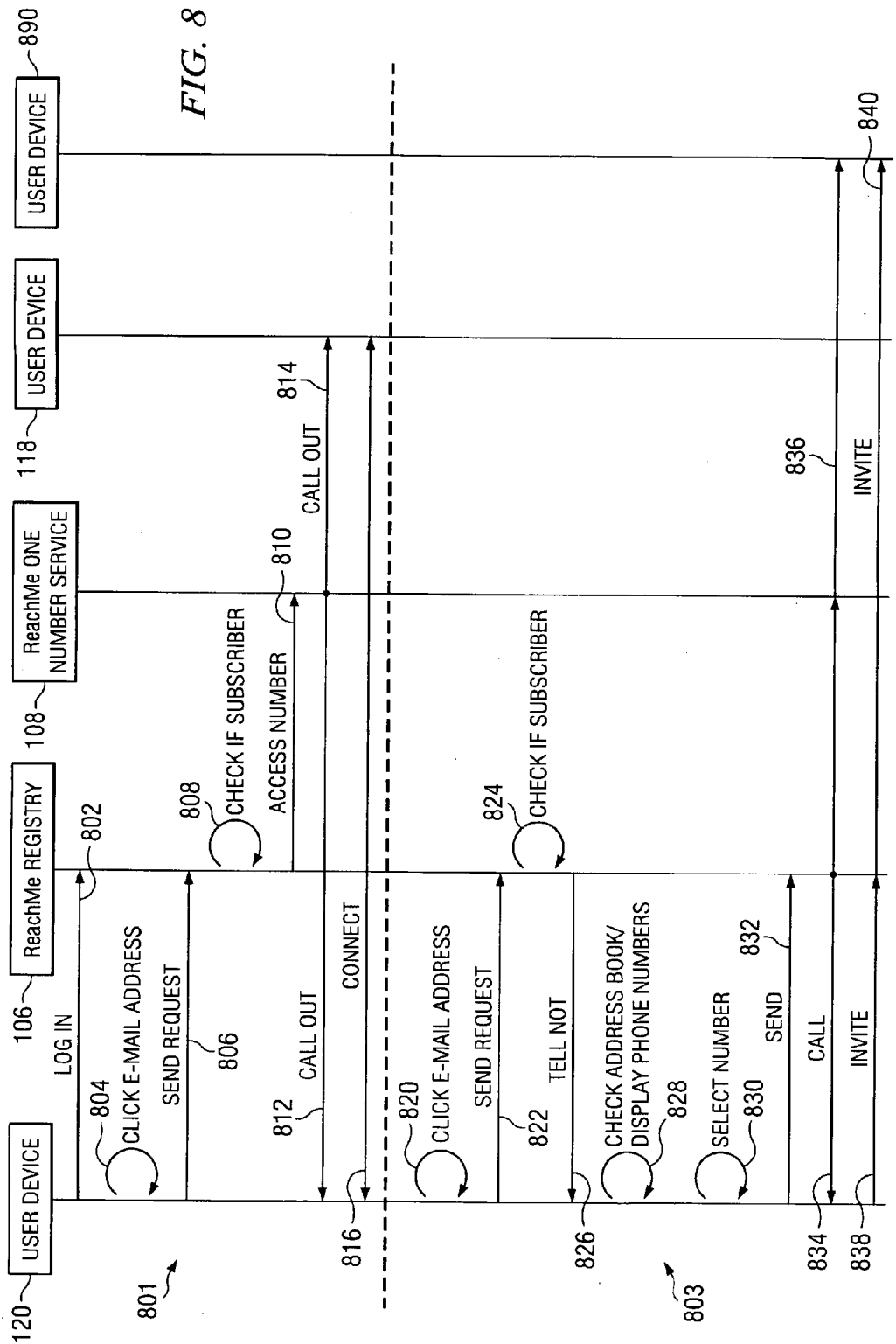
FIG. 8 is a diagram illustrating signaling for operation of embodiments of the present invention.

Turning now to FIG. 8, a diagram illustrating signaling according to an embodiment of the present invention is shown.

Communication among subscribers is shown at 801. Shown are ReachMe service 106, One Number service 108, and user devices 118, 120, and 890. At 802, a user of device 120 can log in to the ReachMe service 106, such as via his ReachMe client (not shown). At 804, he can click on, select, or otherwise enter an e-mail address. At 806, the request is sent to the ReachMe service 106. At 808, the ReachMe service 106 uses the e-mail address to check if the e-mail address corresponds to a subscriber. If so, then in 810, the ReachMe service 106 accesses the number, providing it to the One Number service 108. At 812, the One Number Service 108 calls out to the calling party and at 814 calls out to the called party. The parties are connected at 816.

Communication with a non-subscriber is shown at 803. At 820, a user of device 120 can log in to the ReachMe service 106 such as via his ReachMe client (not shown). At 822, he can click on, select, or otherwise enter an e-mail address to send the request to the ReachMe service 106. At 824, the ReachMe service 106 uses the e-mail address to check if the e-mail address corresponds to a subscriber. If the prospective called party is not a subscriber, then at 826, the ReachMe service 106 will send a message to the caller indicating this. At 828, the user can check his address book for the called party and see if there is a phone number associated with the e-mail. If so, he can select it at 830. This will send it to the ReachMe service 106 at 832. The One Number service or the telephony service can then call the number and the caller, at 834, 636. The user may be prompted to send an invitation request to the called party, which he can do at 838, 840. The request may, for example, be of the form of an e-mail or other message. Further, it is noted that, in some embodiments, the ReachMe service 106 may itself automatically check a network-stored address book associated with the user for an entry corresponding to a non-subscriber. In addition, in some emboidments, the system can generate the invitation automatically. Thus, the figures are exemplary only.

Figure 9:
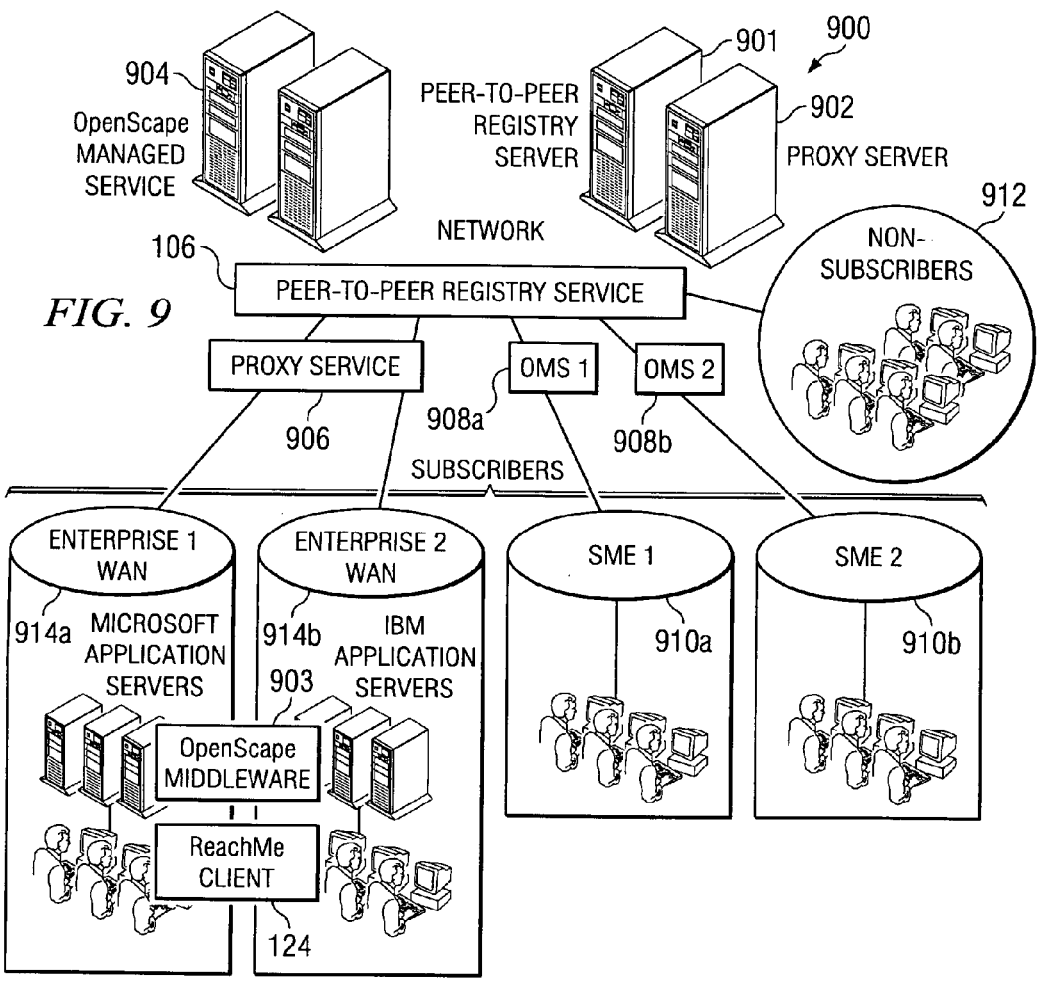
FIG. 9 illustrates an exemplary environment for a system in accordance with embodiments of the present invention.

As discussed above, in certain embodiments of the present invention, a ReachMe service is provided which allows users to call other subscribers via their e-mail addresses. In addition, an improved system and method for adopting a presence or related service may be provided. In some embodiments, the ReachMe service 106 may be provided as a peer-to-peer registry service with a presence and availability service provided in conjunction with a network provider. Such a service provides advantages to service providers in that it allows service providers to provide a One Number Service across networks and platforms and also provides enhanced methods for adopting such services. An exemplary network configuration is shown in FIG. 9.

The network 900 may be exemplary of an intelligent multimedia network offering, for example, telephony, Internet, voice over IP (VoIP), conferencing, messaging, presence, and the like. An exemplary network that may suitably be used in conjunction with embodiments of the present invention is the AT&T telecommunications network.

The network 900 includes a ReachMe peer-to-peer registry service 106, which may be coupled to or in communication with a proxy service 906, and one or more Openscape Managed Services 908a, 908b. The ReachMe registry service 106, the proxy service 906, and the Openscape Managed Services 908a, 908b, may be implemented on one or more network servers 901, 902, and 904, respectively. ("Openscape" is a system available from Siemens Comm., Inc., that provides unification of various communication and presence functions, as will be explained in greater detail below. The present invention, however, is not limited to Openscape.)

The Openscape Managed Services 908a, 908b and the peer-to-peer registry service 106 provide services to one or more network subscribers, such as enterprise WAN 914a, enterprise WAN 914b, and small-medium enterprise 910a, small-medium enterprise 910b. In addition, the ReachMe service 106 may interface to one or more non-subscribers 912.

The enterprise 914a and enterprise 914b may implement one or more instance of the Openscape middleware 903 for communicating with the Openscape managed service(s) provided by the network as well as one or more instances of ReachMe clients 124 in accordance with embodiments of the present invention. A proxy service 906 may be provided for communicating between the enterprise networks and the network servers. The small-medium enterprise networks 910a, 910b may communicate via other Openscape managed services 908a, 908b, respectively. (Large enterprise networks can implement their own Openscape middleware 903, while small-medium enterprises 910a, 910b may require network-based implementations of such services). As will be explained in greater detail below, the users of each of the networks may subscribe and take advantage of the registry services 106. Thus, the registry services 106 provide functionality that is independent of specific enterprise implementations.

Figure 10:
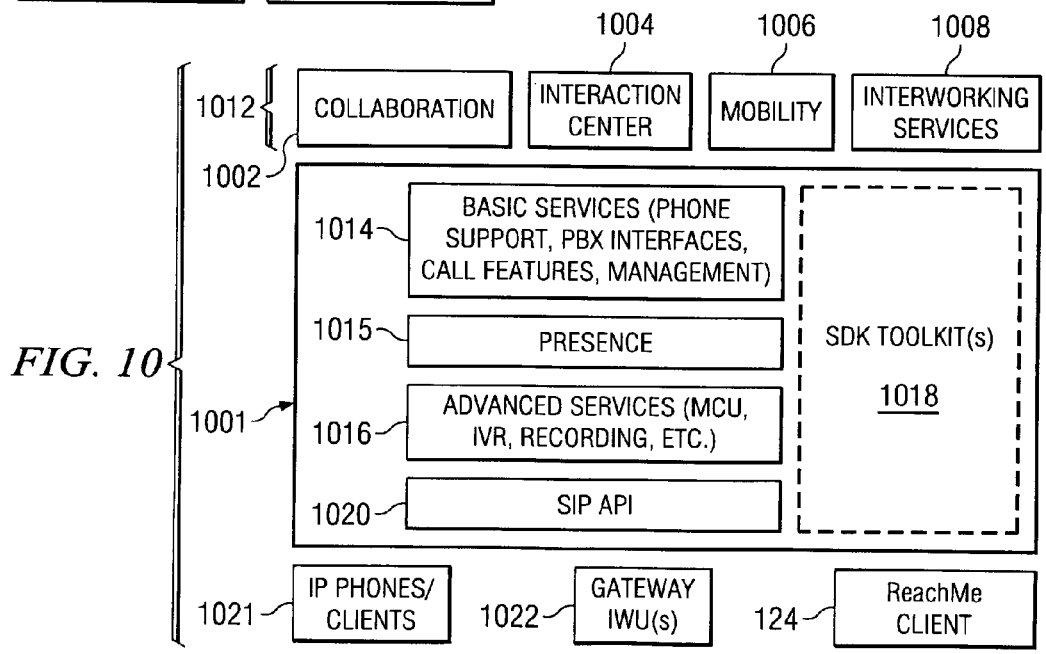
FIG. 10 is a diagram illustrating an exemplary system in accordance with embodiments of the present invention.

Turning now to FIG. 10, a functional model diagram illustrating an Openscape middleware/services and Reachme client is shown. More particularly, FIG. 10 is a logical diagram illustrating a particular embodiment of a middleware or managed services that can communicate with registry service 106. The middleware may be implemented on a server and includes a plurality of application modules 1012 and a communication broker module 1001. In addition, interfaces, such as APIs (application programming interfaces) to SIP phones 1021 and gateways/interworking units 1022, may be provided. The ReachMe client 124 may interact with the various services and applications, as will be explained in greater detail below.

According to the embodiment illustrated, the broker module 1001 includes a basic services module 1014, a presence module 1015, an advanced services module 1016 and a software-developers toolkit module 1018.

The basic services module 1014 functions to implement, for example, phone support, PBX interfaces, call features and management, as well as Windows Messaging and RTC add-ins, when necessary. The phone support features allow maintenance of and access to buddy lists and provide presence status.

The advanced services module 1016 implements function such as presence, multipoint control unit (MCU), recording, and the like. MCU functions are used for voice conferencing and support ad hoc and dynamic conference creation from a buddy list following the SIP conferencing model for ad hoc conferences. In certain embodiments, support for G.711 and G.723.1 codecs is provided. Further, in certain embodiments, the MCU can distribute media processing over multiple servers using the MEGACO protocol.

Presence features 1015 provide device context for both SIP registered devices and user-defined non-SIP devices. Various user contexts, such as In Meeting, On Vacation, In the Office, etc., can be provided for. In addition, voice, e-mail and instant messaging availability may be provided across the user's devices. The presence feature enables real time call control using presence information, e.g., to choose a destination based on the presence of a user's devices. In addition, various components have a central repository for presence information and for changing and querying presence information. In addition, the presence module 1015 provides a user interface for presenting the user with presence information.

The broker module 1001 may include the ComResponse platform, available from Siemens Information and Communication Networks, Inc. ComResponse features include speech recognition, speech-to-text, and text-to-speech, and allow for creation of scripts for applications.

In addition, real time call control is provided by a SIP API 1020 associated with the basic services module 1014. That is, calls can be intercepted in progress and real time actions performed on them, including directing those calls to alternate destinations based on rules and or other stimuli. The SIP API 1020 also provides call progress monitoring capabilities and for reporting status of such calls to interested applications. The SIP API 1020 also provides for call control from the user interface.

According to the embodiment illustrated, the application modules 1012 include a collaboration module 1002, an interaction center module 1004, a mobility module 1006, an interworking services module 1008.

The collaboration module 1002 allows for creation, modification or deletion of a collaboration session for a group of users. The collaboration module 1002 may further allow for invoking a voice conference from any client. In addition, the collaboration module 1002 can launch a multi-media conferencing package, such as the WebEx package. It is noted that the multi-media conferencing can be handled by other products.

The interaction center 1004 provides a telephony interface for both subscribers and guests. Subscriber access functions include calendar access and voicemail and e-mail access. The calendar access allows the subscriber to accept, decline, or modify appointments, as well as block out particular times. The voicemail and e-mail access allows the subscriber to access and sort messages.

Similarly, the guest access feature allows the guest access to voicemail for leaving messages and calendar functions for scheduling, canceling, and modifying appointments with subscribers. Further, the guest access feature allows a guest user to access specific data meant for them, e.g., receiving e-mail and fax back, etc.

The mobility module 1006 provides for message forwarding and "one number" access across media, and message "morphing" across media for the subscriber. Further, various applications can send notification messages to a variety of destinations, such as e-mails, instant messages, pagers, and the like. In addition, the subscriber can set rules that the mobility module 1006 uses to define media handling, such as e-mail, voice and instant messaging handling. Such rules specify data and associated actions. For example, a rule could be defined to say "If I'm traveling, and I get a voicemail or e-mail marked Urgent, then page me."

As noted above, an exemplary server environment capable of being adapted for use in a system according to embodiments of the present invention is the OpenScape system, available from Siemens Communications, Inc. Such an environment can be implemented, for example, in conjunction with Windows Server, Microsoft Office Live Communications Server, Microsoft Active Directory, Microsoft Exchange and SQL Server.

Figure 11:
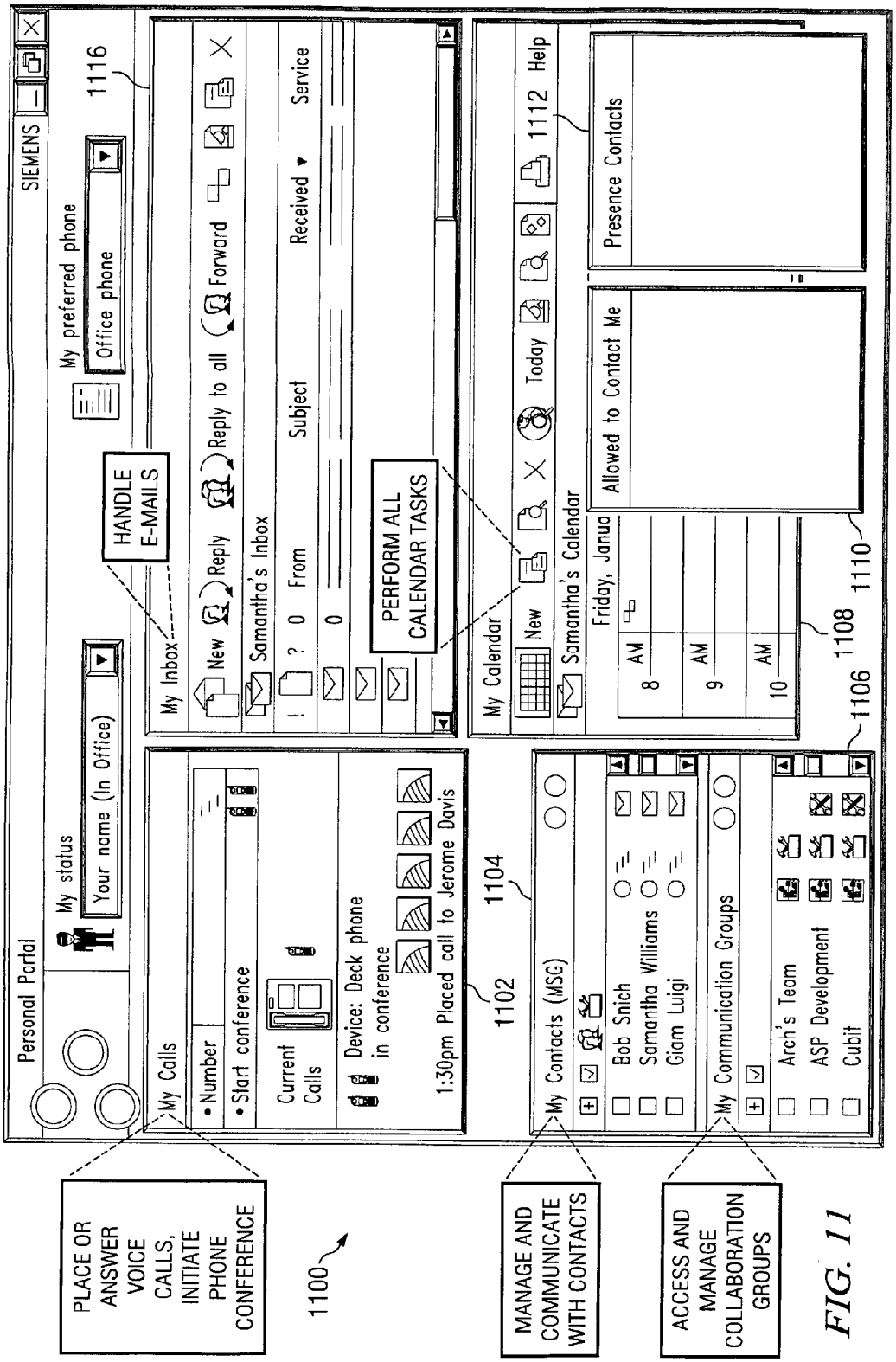
FIG. 11 is a diagram illustrating an exemplary user interface of embodiments of the present invention.

An exemplary browser-type graphical user interface for such a system is shown in FIG. 11. In particular, interface 1100 shows a personal portal for such a system. In the embodiment illustrated, the personal portal 1100 includes call status indicia 1102, contacts list or address book 1104, collaboration groups 1106, a calendar 1108, various user or contact lists, such as allowed to contact me list 1110 and presence contacts (buddies) 1112, and an inbox 1116. The interface 1102 may be used, for example, to make a one number call in accordance with embodiments of the present invention, by selecting an e-mail address or other indicia from a contact list 1104 or other window, in a manner similar to that discussed above.

In addition, one aspect of the present invention relates to a "viral" presence adoption model, in which various of the user's presence contact lists, such as allowed to contact me list 1110 and presence contacts 1112, may be populated by use of existing address books, such as an Outlook address book 1104.

Figure 12A:
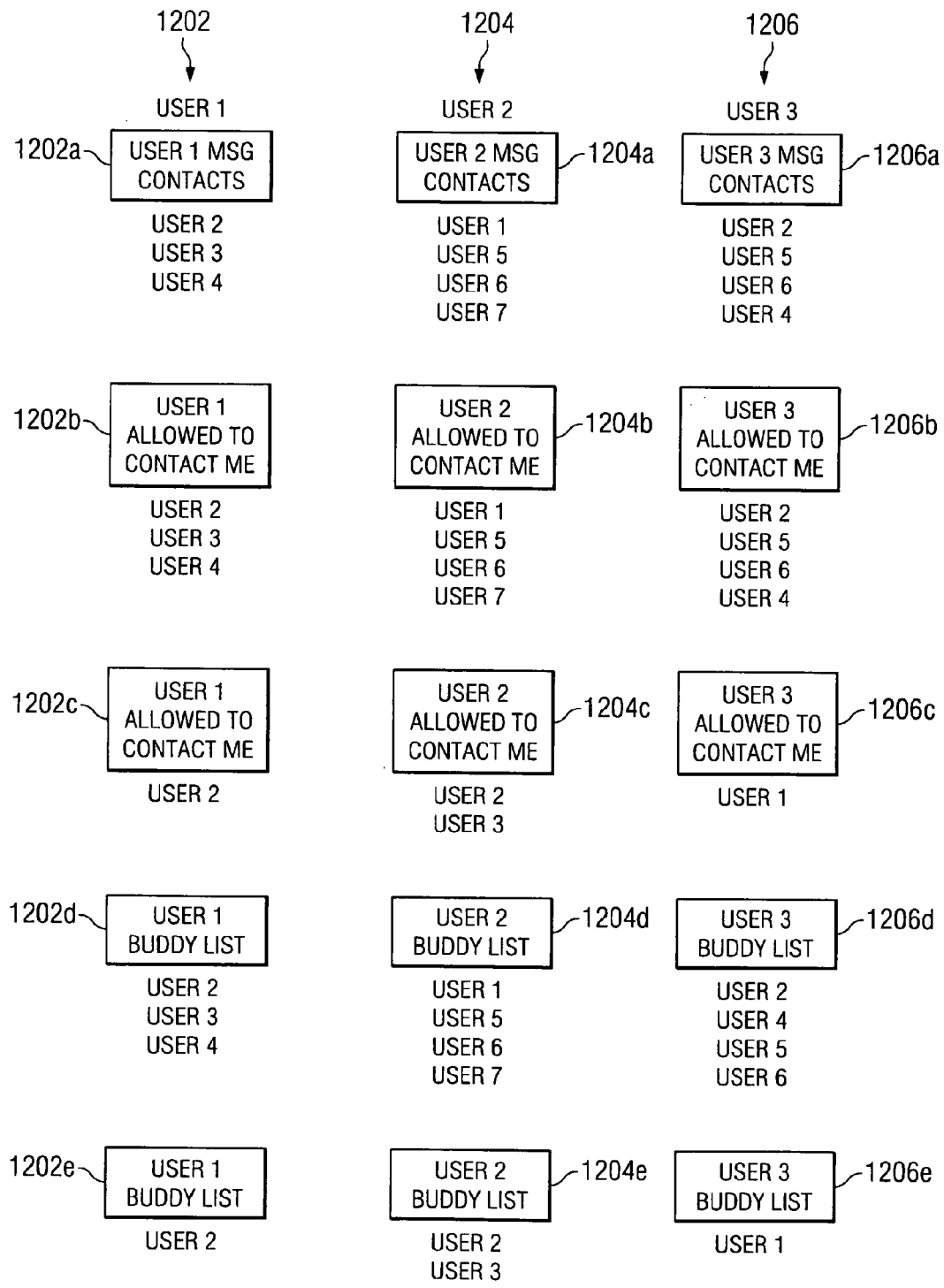
FIG. 12A and FIG. 12B illustrate operation of embodiments of the present invention.

Operation of an embodiment of the present invention is illustrated schematically by way of example in FIG. 12A. Shown are user 1 1202, user 2 1204, and user 3 1204. Each user has a messaging address book or contact list 1202a, 1204a, 1206a, respectively. As noted above, the address book is representative of, for example, an Outlook address book.

User 1 1202's address book 1202a includes entries for User 2, User 3, User 4. User 2 1204's address book includes entries for User 1, User 5, User 6, User 7. User 3 1206's address book includes entries for User 2, User 4, User 5, and User 6.

According to some embodiments of the present invention, users may populate their "allowed to contact me" contact lists with the contents of their Outlook address books. Thus user 1's "allowed" list 1202b includes the users 2, 3, and 4; user 2's allowed list 1204b includes users 1, 5, 6, and 7; and user 3's allowed list 1206b includes user 2, 4, 5, and 6.

According to other embodiments, the allowed contact list may be populated with those parties who list the user in their address books. Thus, user 1's allowed list 1202c includes user 3; user 2's 1204c includes user 1 and use 2; and user 3's allowed list 1206c includes user 1.

According to some embodiments of the present invention, users may populate their contact or watch lists with the contents of their Outlook address books. Thus user 1's "watch" list 1202d includes the users 2, 3, and 4; user 2's watch list 1204d includes users 1, 5, 6, and 7; and user 3's watch list 1206d includes user 2, 4, 5, and 6.

According to other embodiments, the contact list may be populated with those parties who list the user in their address books. Thus, user 1's watch list 1202e includes user 3; user 2's 1204e includes user 1 and use 2; and user 3's watch list 1206e includes user 1.

As noted above, aspects of the present invention relate to a "viral" adoption of contacts for presence contact lists. This is illustrated more particularly by way of example with reference to FIG. 12B.

Figure 12B:
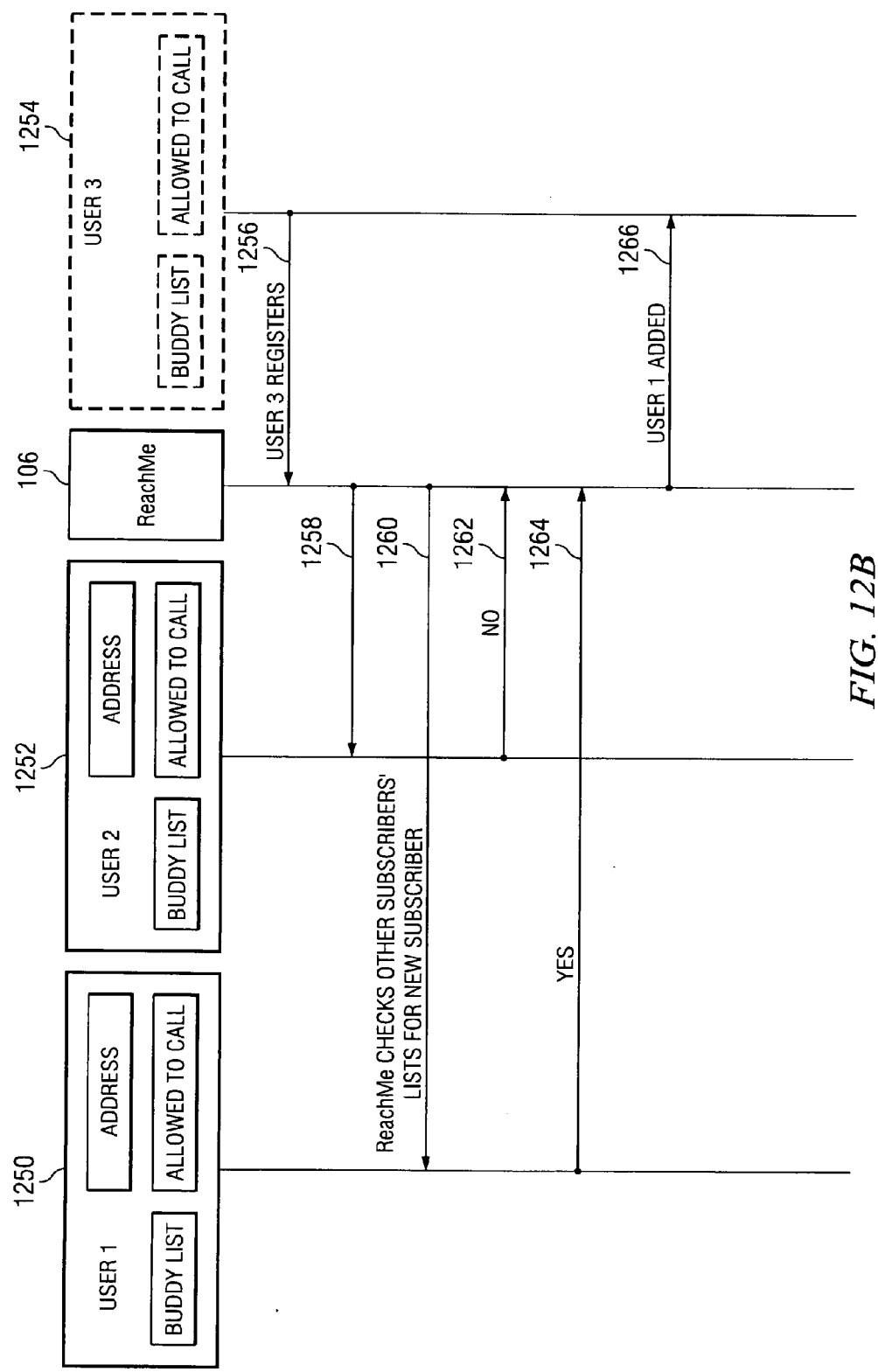

In particular, shown in FIG. 12B are a user 1 1250, a user 2 1252, and a user 3 1254, as well as ReachMe registry service 106. User 1 1250 and User 2 1252 are current subscribers and have buddy (presence contact), allowed to call, and address lists. User 3 1254 is not currently a subscriber but may elect to subscribe, as shown at 1256. For example, the user 3 1256 may subscribe in response to the e-mail invitation discussed above.

At 1258 and 1260, the ReachMe service 106 may check to see if the User 3 1254 is on any of the existing subscribers' contact, address, or allowed to call lists. This may take the form of a communication with the remote user devices or simply accessing one or more databases that are local to the ReachMe registry 106.

At 1262, User 2 1252 indicates that User 3 is not on any of its lists. At 1264, User 1 responds that User 3 is on at least one of its lists. Alternatively, as noted above, the ReachMe service 106 could make this determination itself by accessing one or more databases. In any case, since it has been determined that the User 3 is on one of User 1 1250's lists (such as the address book, the buddy list, or the allowed-to-call-me list), User 1 is added to User 3 1254's lists at 1266. For example, the User 1 1250 can be added to the User 3 1254's buddy, allowed-to-call-me, or address book. In some embodiments, the User 3 can specify which, any, or all.

It is noted that, depending on the embodiment, the address books and contact lists can be stored either locally at each client or user or on a network level, or in some combination. Thus, the figures are exemplary only.

Figure 13:
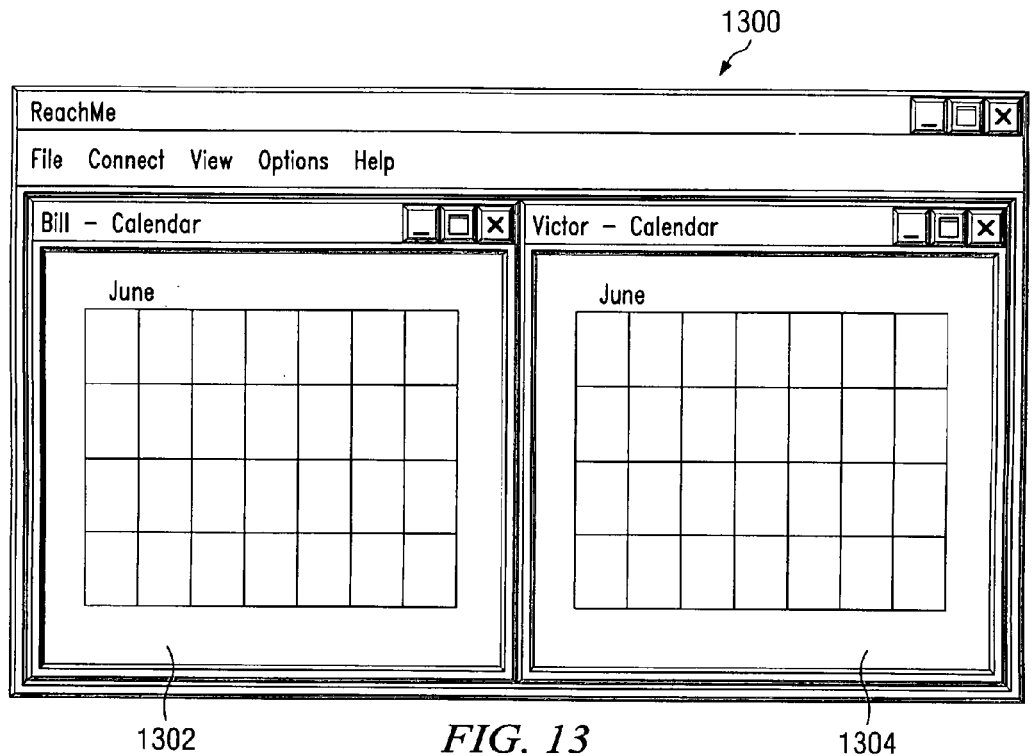
FIG. 13 is a diagram illustrating an exemplary user interface of embodiments of the present invention.

Embodiments of the present invention also allow accessing a calendar and displaying it between the ReachMe registry subscribers. That is, in some embodiments, exchanging or populating the address books and lists also includes permitting access to parties' respective calendars. Thus, for example, as shown at FIG. 13, a graphical interface 1300 can be used to display in a split window the calendars 1302 and 1304 of respective users. Advantageously, by providing a peer-to-peer service provider based service, the ReachMe service allows for calendar sharing and other information sharing regardless of whether the individual parties are on the same calendar or other system.

As can be appreciated, by allowing the population of a presence contact list with entries from one or more parties' Outlook contact lists, the resulting contact list could be relatively cumbersome. Accordingly, embodiments of the present invention allow for efficiently organizing large numbers of contacts based on particular fields in each address book entry.

Figure 14:
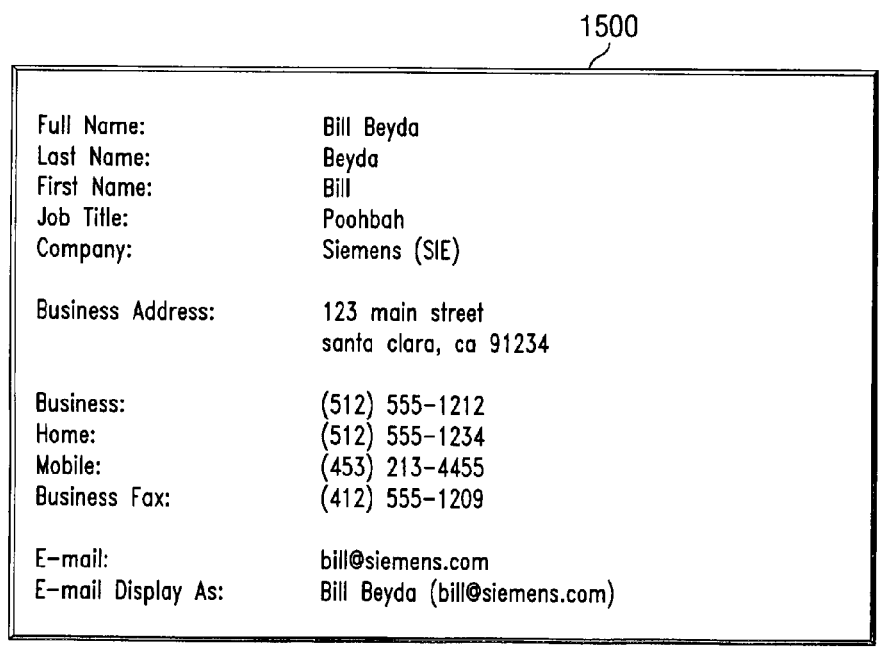
FIG. 14 is a diagram illustrating an exemplary user interface of embodiments of the present invention.

For example, shown in FIG. 14 is an exemplary address book entry. The address book entry 1500 is representative of, for example, an Outlook address book entry.

As shown, entries include full name, last name, first name, job title, company, business address, business, home, mobile, and fax telephone numbers, and e-mail.

As will be explained in greater detail below, the company can be defined in terms of a complete company name, or other company identifier, such as a stock symbol. In some embodiments, the company name or identifier may be derived from the e-mail address domain name. The entry contacts can then be organized according to the stock symbol or domain name. Alternatively, the entries could be organized by one of the geographic markers, such as city, state, zip (or postal) code, or area (or calling) code.

Figure 17:
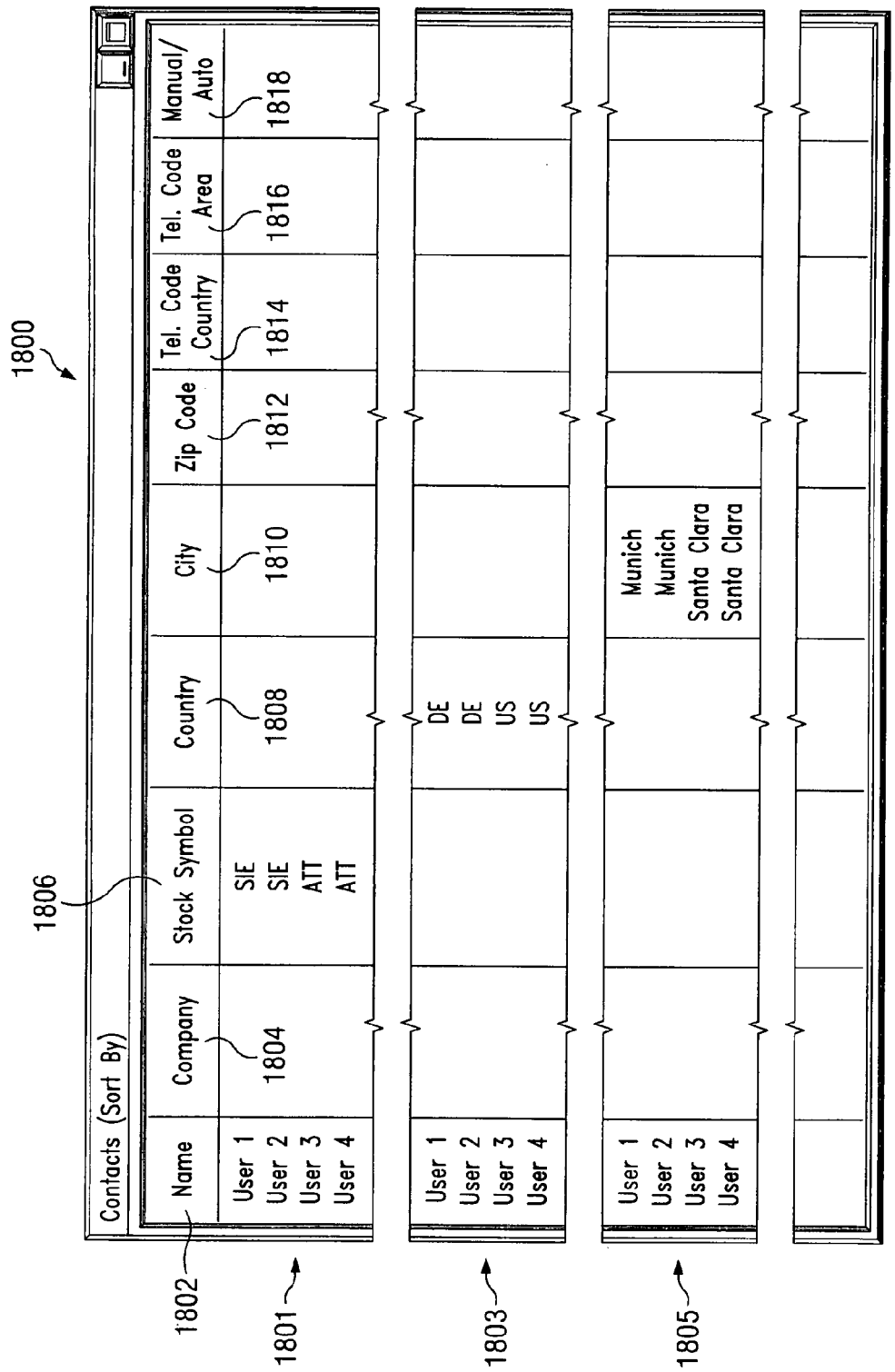
FIG. 17 is diagram illustrating operation of embodiments of the present invention.

For example, shown in FIG. 17 is an exemplary user interface 1800 for displaying contacts. At 1801, 1803, 1805, the entries are grouped in accordance with embodiments of the present invention. Shown are various fields that can be used to organize the contacts. For example, fields include name 1802, company 1804, stock symbol 1806, country 1808, city 1810, zip code 1812, telephone code 1814, area code 1816, and whether the entry was added manually or automatically 1818.

As shown at 1801, the entries are sorted according to stock symbol. The stock symbol may be stored by the user or may be accessed by a database engine (not shown) after a company name is provided. Thus, User 1 and User 2 are associated with SIE whereas User 3 and User 4 are associated with ATT.

As shown at 1803, the contacts are sorted according to country (DE, US). As shown at 1805, the entries are sorted according to city (Munich, Santa Clara).

In some embodiments, the user is able to take automatic action on particular entries based on sorting. For example, the user could "blacklist" predetermined automatically-added entries. Further, in some embodiments, the contacts can be sorted according to whether they are on the user's contact list, on other users' contact lists, or on both.

Embodiments of the present invention thus allow users to select a method of sorting. Thus, for example, an exemplary graphical user interface 1600 is shown in FIG. 15. The GUI 1600 includes a drop down or other menu 1602 for selecting the particular sorting criteria, as well as a contacts list display 1604 in which the sorted contacts may be displayed.

Similarly, FIG. 16 illustrates a GUI 1700 that shows a do not call list that can be sorted by the chosen criteria 1702. That is, the do not call list may be sorted and specified according to the sorting criteria 1702. It is noted that the configuration and criteria shown in FIGS. 16 and 17 are exemplary only.

Turning now to FIG. 18, a flowchart 1900 illustrating operation of embodiment of the present invention is shown. The particular arrangement of elements in the flowchart 1900 is not meant to imply a fixed order to the elements; embodiments can be practiced in any order that is practicable.

In a process step 1902, a user can download contacts into one of his contact lists, in a manner similar to that discussed above. In a process step 1904, the user can choose to sort contacts, for example, by opening a window such as shown in FIG. 15 and FIG. 16. In a process step 1906, the user can choose sorting criteria. Finally, in a step 1908, the list can be sorted. It is noted that, depending on the environment, a variety of lists can be sorted in this fashion, such as the user's presence contact list and the "allowed to contact" list.

Figure 19:
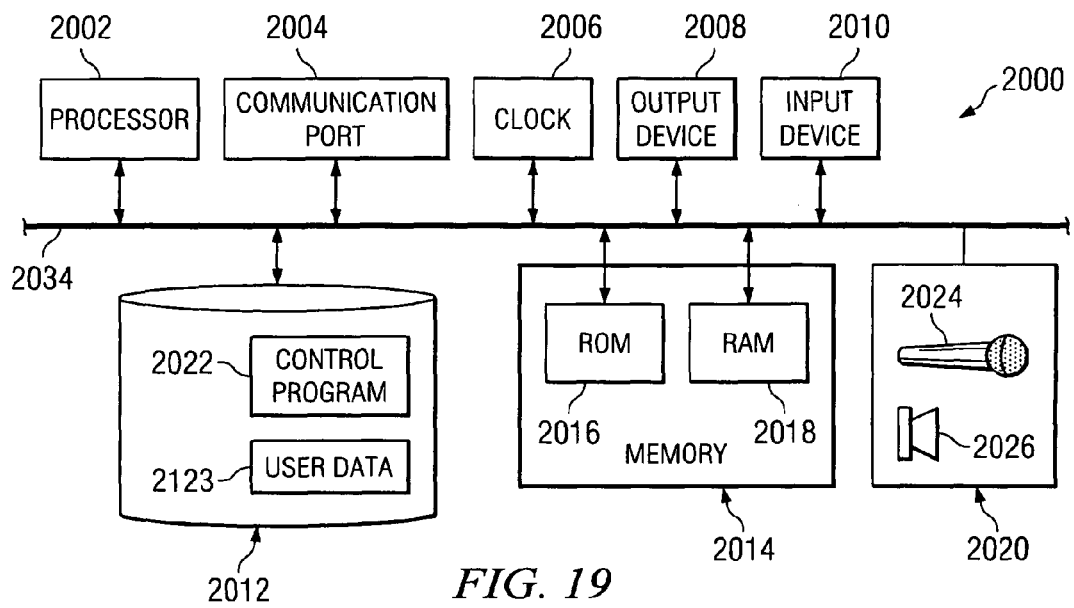
FIG. 19 is a block diagram for a processing device for use in accordance with embodiments of the present invention.

Now referring to FIG. 19, a representative block diagram of an exemplary computer or processing device 2000 suitable for use as a user device or a server according to embodiments of the present invention is shown. In particular, the computer 2000 may be a device suitable for accessing or implementing a service or clients in accordance with embodiments of the present invention. In some embodiments, the computer 2000 may include or operate a web browser or multimedia messaging system or clients. The computer 2000 may be embodied as a single device or computer, a networked set or group of devices or computers, a workstation, mainframe or host computer, etc. In some embodiments, the computer 2000 may implement one or more elements of the methods disclosed herein.

The computer 2000 may include a processor, microchip, central processing unit, or computer 2002 that is in communication with or otherwise uses or includes one or more communication ports or network interfaces 2004 for communicating with user devices and/or other devices. The communication ports 2004 may include such things as telephone adapters, local area network adapters, wireless communication devices, Bluetooth technology, etc. The computer 2000 also may include an internal clock element 2006 to maintain an accurate time and date for the computer 2000, create time stamps for communications received or sent by the computer 2000, etc.

If desired, the computer 2000 may include one or more output devices 2008 such as a printer, infrared or other transmitter, antenna, display screen or monitor, text to speech converter, speaker, etc., as well as one or more input devices 2010 such as a bar code reader or other optical scanner, infrared or other receiver, antenna, magnetic stripe reader, image scanner, roller ball, touch pad, joystick, touch screen, computer keyboard, computer mouse, microphone, etc. In some embodiments, the computer 2000 may include a telephony interface 2020 including, for example, a microphone 2024 and speaker 2026.

In addition to the above, the computer 2000 may include a memory or data storage device 2012 to store information, software, databases, documents, communications, device drivers, etc. The memory or data storage device 2012 may be implemented as an appropriate combination of magnetic, optical and/or semiconductor memory, and may include, for example, Read-Only Memory (ROM), Random Access Memory (RAM), a tape drive, flash memory, a floppy disk drive, a Zip™ disk drive, an optical disk such as a compact disc or DVD and/or a hard disk. Thus, the storage device 2012 may include various combinations of moveable and fixed storage. The computer 2000 also may include memory 2014, such as ROM 2016 and RAM 2018.

The processor 2002 and the data storage device 2012 in the computer 2000 each may be, for example: (i) located entirely within a single computer or other computing device; or (ii) connected to each other by a remote communication medium, such as a serial port cable, telephone line or radio frequency transceiver. In one embodiment, the computer 2000 may be implemented as one or more computers that are connected to a remote server computer, as will be explained in greater detail below.

A conventional personal computer or workstation with sufficient memory and processing capability may be used as the computer 2000. The computer 2000 may be capable of high volume transaction processing, performing a significant number of mathematical calculations in processing communications and database searches. A Pentium™ microprocessor such as the Pentium III™ or IV™ microprocessor, manufactured by Intel Corporation may be used for the processor 2002. Other suitable processors may be available from various manufacturers, such as AMD, or Sun Microsystems, Inc. The processor 2002 also may be embodied as one or more microprocessors, computers, computer systems, etc.

Software may be resident and operating or operational on the computer 2000. The software may be stored on the data storage device 2012 and may include one or more control programs 2022. The control programs 2022 may implement the various services and clients described herein. The data storage device 2012 may further store user data 2123, such as user lists, registries, etc.

It is noted that, while illustrated as software stored in storage medium 2012, the various control modules in accordance with embodiments of the present invention may also include related firmware and/or hardware components. Thus, the figure is exemplary only.

The control program 2022 may control the processor 2002. The processor 2002 may perform instructions of the control program 2022, and thereby operate in accordance with the methods described in detail herein. The control programs may be stored in a compressed, uncompiled and/or encrypted format. The control programs furthermore include program elements that may be necessary, such as an operating system, a database management system and device drivers for allowing the processor 2002 to interface with peripheral devices, databases, etc. Appropriate program elements are known to those skilled in the art, and need not be described in detail herein.

According to some embodiments, the instructions of the control program may be read into a main memory from another computer-readable medium, such as from the ROM 2016 to the RAM 2018. Execution of sequences of the instructions in the control program causes the processor 2002 to perform the process elements described herein. In alternative embodiments, hard-wired circuitry may be used in place of, or in combination with, software instructions for implementation of some or all of the methods described herein. Thus, embodiments are not limited to any specific combination of hardware and software.

The processor 2002, communication ports 2004, clock 2006, output device 2008, input device 2010, data storage device 2012, ROM 2016 and RAM 2018 may communicate or be connected directly or indirectly in a variety of ways. For example, the processor 2002, communication ports 2004, clock 2006, output device 2008, input device 2010, data storage device 2012, ROM 2016 and RAM 2018 may be connected via a bus 2034.

While specific implementations and hardware/software configurations for the computer 2000 have been illustrated, it should be noted that other implementations and hardware configurations are possible and that no specific implementation or hardware/software configuration is needed. Thus, not all of the components illustrated in FIG. 19 may be needed for the computer 2000 implementing the methods disclosed herein.

Figure 20:
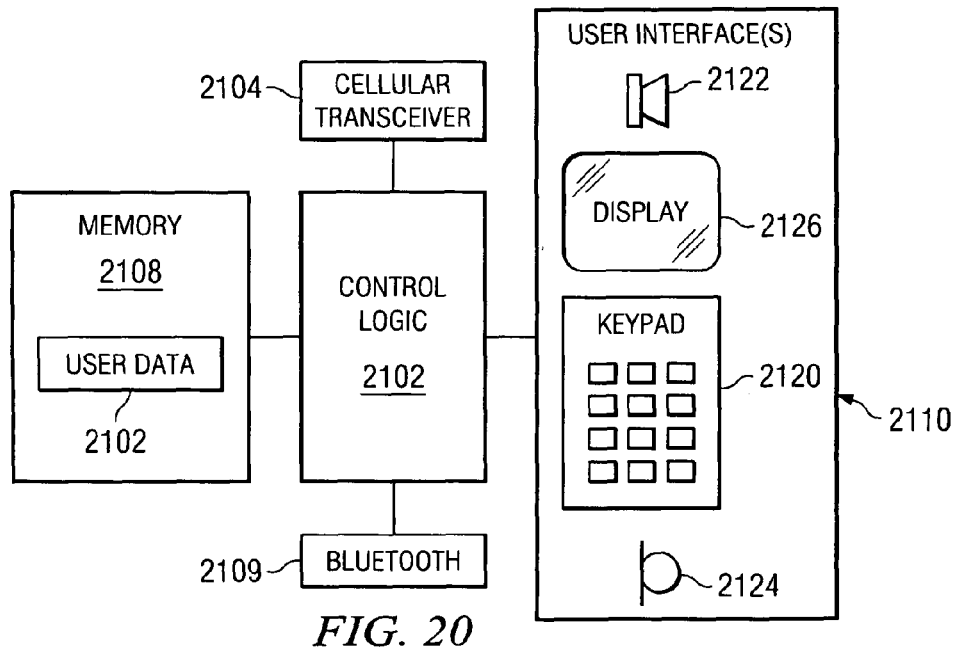
FIG. 20 is a block diagram for a processing device for use in accordance with embodiments of the present invention.

Some embodiments of the present invention may be implemented in or in conjunction with a telephone, such as a wireless or cellular telephone or PocketPC. An exemplary cellular telephone 2100 including capabilities in accordance with an embodiment of the present invention is shown in FIG. 20. In some embodiments, the cellular telephone 2100 may implement one or more elements of the methods disclosed herein. As shown, the cellular telephone includes control logic 2102 and cellular transceiver 2104. The cellular transceiver 2104 allows communication over a cellular telephone network, such as a GSM or GPRS based cellular telephone network. The control logic 2102 generally controls operation of the cellular telephone and, in some embodiments, implements various of the clients discussed above.

The control logic 2102 interfaces to a memory 2108 for storing, among other things, user data 2102 such as contact or address lists. The control logic 1002 also interfaces to a user interface(s) 2110. The user interface(s) 2121 can include a keypad 2120, speaker 2122, microphone 2124, and display 2126. The keypad may include one or more "hard" keys and may be implemented in whole or in part as a cursor pointing device in association with one or more "virtual" keys on the display 2126. In general, a user may make use of the keypad 2120 and display 2126 to enter contact information, and may speak into the microphone to provide the audio input(s). It is noted that other interfaces, such as voice activated interfaces may be provided. Thus, the figure is exemplary only. In addition, a Bluetooth interface may be provided.

While specific implementations and hardware/software configurations for the mobile computing device have been illustrated, it should be noted that other implementations and hardware configurations are possible and that no specific implementation or hardware/software configuration is needed. Thus, not all of the components illustrated may be needed for the mobile computing device implementing the methods disclosed herein.

As used herein, whether in the above description or the following claims, the terms "comprising," "including," "carrying," "having," "containing," "involving," and the like are to be understood to be open-ended, that is, to mean including but not limited to. Only the transitional phrases "consisting of" and "consisting essentially of," respectively, shall be considered exclusionary transitional phrases, as set forth with respect to claims, in the United States Patent Office Manual of Patent Examining Procedures.

Any use of ordinal terms such as "first," "second," "third," etc., in the claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The above described embodiments are intended to illustrate the principles of the invention, but not to limit the scope of the invention. Various other embodiments and modifications to these preferred embodiments may be made by those skilled in the art without departing from the scope of the present invention.

What is claimed is:

1. A method for making telephone calls comprising:
    a server receiving a request from a calling party to call a called party, the request identifying an e-mail address of the called party;
    the server determining whether the called party is registered with a one number service hosted by the server:
    upon a determination that the called party is not registered with the service, an invitation to register with the service being sent to the e-mail address of the called party;
    the server receiving a response to the invitation to register with the server to utilize the service hosted by the server;
    the server associating the e-mail address with a first telephone number upon receipt of the response to the invitation;
    the server associating at least one second telephone number with the e-mail address and the first telephone number;
    the server allowing telephone calls to the first telephone number upon receipt of information from the calling party that indicates the e-mail address was selected for initiating a telephone call by the calling party after the called party is registered with the server; and
    upon a determination that the called party is registered with the service hosted by the server, the server establishing a telephone call to the called party via the first telephone number based upon the e-mail address identified in the received request.

2. The method in accordance with claim 1, further comprising:
    the calling party selecting the e-mail address for sending the request to the server by dragging a representation of the e-mail address displayed in a graphical user interface of a user device or by clicking on the displayed e-mail address.

3. The method in accordance with claim 2, further comprising displaying an address book entry for the called party associated with the selected e-mail address.

4. The method of claim 1 further comprising:
    checking contact lists of the called party and the calling party to determine whether the called party is within the contacts list of the calling party;
    upon a determination that the called party is within the contacts list of the calling party, updating the contacts list of the called party to include the calling party.

5. The method of claim 4 wherein the server checks the contacts lists and causes the contacts lists of the called party to be updated.

6. The method of claim 4 wherein the updating of the contacts list of the called party occurs automatically.

7. The method of claim 4 wherein the contacts list of the calling party is stored on a user device of the calling party and the contacts list of the called party is stored on a user device of the called party.

8. A telecommunications system, comprising:
    a network;
    a plurality of user devices coupled to the network, the user devices comprising a first user device and a second user device, the first user device associated with a first user and the second user device associated with a second user;

a first server coupled to the network that hosts an e-mail service;

a second server coupled to the network;

the second server receiving a request to initiate a telephone call to the second user, the request identifying an e-mail address of the second user;

the second server determining whether the second user is registered with a one number service hosted by the second server;

upon a determination that the second user is not registered with the one number service hosted by the second server, the second server causing an invitation to register with the one number service to be sent to the e-mail address of the second user;

the second server receiving a response to the invitation to register with the second server to utilize the one number service hosted by the second server;

the second server associating the e-mail address with a first telephone number upon receipt of the response to the invitation;

the second server associating at least one second telephone number with the e-mail address and the first telephone number;

the server allowing telephone calls to the first telephone number upon receipt of information from the first user that indicates the e-mail address was selected for initiating a telephone call by the second user; and upon a determination that the second user is registered with the one number service hosted by the second server, the second server establishing a telephone call to the second user via the first telephone number based upon the e-mail address identified in the received request.

9. The system in accordance with claim 8, further comprising a packet telephone network for making a telephone call.

10. The system of claim 8 wherein the second server communicates with the first user device to prompt the first user to send the invitation as an e-mail so that the invitation to register with the second server is sent as an e-mail to the second user that is addressed via the e-mail address.

11. The system in accordance with claim 10, further comprising an e-mail generator configured to send the invitation.

12. The system in accordance with claim 10, further comprising a packet telephone interface for making a telephone call to the second user over a packet network.

13. The system of claim 8 wherein the second server checking contact lists of the second user and the first user to determine whether the second user is within the contacts list of the second user;

upon a determination that the second user is within the contacts list of the first user, updating the contacts list of the second user to include the first user.

14. The system of claim 13 wherein the contacts list of the first user is stored on the first user device and the contacts list of the second user is stored on the second user device.

15. The system of claim 13 wherein the updating of the contacts list of the second user occurs automatically.

16. The system of claim 8 wherein each of the user devices is one of a telephone, a cellular telephone, and a computer.

* * * * *